(12) United States Patent
Ll et al.

(10) Patent No.: US 9,230,541 B2
(45) Date of Patent: Jan. 5, 2016

(54) KEYWORD DETECTION FOR SPEECH RECOGNITION

(71) Applicant: Tencent Technology (Shenzhen) Company Limited, Shenzhen (CN)

(72) Inventors: Lu Ll, Shenzhen (CN); Li Lu, Shenzhen (CN); Jianxiong Ma, Shenzhen (CN); Linghui Kong, Shenzhen (CN); Feng Rao, Shenzhen (CN); Shuai Yue, Shenzhen (CN); Xiang Zhang, Shenzhen (CN); Haibo Liu, Shenzhen (CN); Eryu Wang, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/567,969

(22) Filed: Dec. 11, 2014

(65) Prior Publication Data

US 2015/0095032 A1 Apr. 2, 2015

Related U.S. Application Data

(63) Continuation of application No. PCT/CN2014/082332, filed on Jul. 16, 2014.

(30) Foreign Application Priority Data

Aug. 15, 2013 (CN) .......................... 2013 1 0355905

(51) Int. Cl.
*G10L 15/08* (2006.01)

(52) U.S. Cl.
CPC ............... *G10L 15/08* (2013.01); *G10L 15/083* (2013.01); *G10L 2015/088* (2013.01)

(58) Field of Classification Search
CPC ..... G10L 15/00; G10L 15/083; G10L 15/142; G10L 15/12
USPC ......................................... 704/231, 242, 251
See application file for complete search history.

(56) References Cited

U.S. PATENT DOCUMENTS

| | | | | |
|---|---|---|---|---|
| 5,388,183 A | * | 2/1995 | Lynch ................... | G10L 15/083 704/236 |
| 5,758,023 A | * | 5/1998 | Bordeaux ............... | G10L 15/16 704/232 |

(Continued)

FOREIGN PATENT DOCUMENTS

| | | |
|---|---|---|
| CN | 101447185 A | 6/2009 |
| CN | 101847149 A | 9/2010 |
| CN | 102194454 A | 9/2011 |

OTHER PUBLICATIONS

Rose, "Keyword detection in conversational speech utterances using hidden Markov model based continuous speech recognition", Computer Speech and Language (1995) 9, 309-333.*

(Continued)

*Primary Examiner* — Jialong He
(74) *Attorney, Agent, or Firm* — Morgan, Lewis & Bockius LLP

(57) ABSTRACT

This application discloses a method implemented of recognizing a keyword in a speech that includes a sequence of audio frames further including a current frame and a subsequent frame. A candidate keyword is determined for the current frame using a decoding network that includes keywords and filler words of multiple languages, and used to determine a confidence score for the audio frame sequence. A word option is also determined for the subsequent frame based on the decoding network, and when the candidate keyword and the word option are associated with two distinct types of languages, the confidence score of the audio frame sequence is updated at least based on a penalty factor associated with the two distinct types of languages. The audio frame sequence is then determined to include both the candidate keyword and the word option by evaluating the updated confidence score according to a keyword determination criterion.

20 Claims, 6 Drawing Sheets

(56) References Cited

U.S. PATENT DOCUMENTS

| | | | | |
|---|---|---|---|---|
| 6,067,520 A * | 5/2000 | Lee | ............ | G10L 15/144 704/231 |
| 6,085,160 A * | 7/2000 | D'hoore | ............ | G09B 19/06 704/2 |
| 6,138,095 A * | 10/2000 | Gupta | ............ | G10L 15/08 704/233 |
| 7,043,431 B2 * | 5/2006 | Riis | ............ | G10L 13/08 704/243 |
| 7,415,411 B2 * | 8/2008 | Reinhard | ............ | G10L 15/187 704/10 |
| 7,725,318 B2 * | 5/2010 | Gavalda | ............ | G06F 17/30684 704/245 |
| 7,904,296 B2 * | 3/2011 | Morris | ............ | G10L 15/04 704/231 |
| 8,255,215 B2 * | 8/2012 | Li | ............ | G10L 15/02 704/224 |
| 2002/0087311 A1 | 7/2002 | Leung Lee et al. | | |
| 2005/0119897 A1 * | 6/2005 | Bennett | ............ | G06F 17/3048 704/270.1 |
| 2005/0182628 A1 | 8/2005 | Choi | | |
| 2007/0294082 A1 * | 12/2007 | Jouvet | ............ | G10L 15/005 704/231 |
| 2010/0211376 A1 * | 8/2010 | Chen | ............ | G10L 15/187 704/2 |

OTHER PUBLICATIONS

Köhler, Joachim. "Multilingual phone models for vocabulary-independent speech recognition tasks." Speech Communication 35.1 (2001): 21-30.*

Wu, "Multi-keyword spotting of telephone speech using a fuzzy search algorithm and keyword-driven two-level CBSM", Speech Communication 33 (2001) 197-212.*

Tencent Technology, ISRWO, PCT/CN2014/082332, Oct. 27, 2014, 7 pgs.

* cited by examiner

KEYWORD DETECTION FOR SPEECH RECOGNITION

RELATED APPLICATIONS

This application is a continuation application of PCT Patent Application No. PCT/CN2014/082332, entitled "KEYWORD DETECTION FOR SPEECH RECOGNITION" filed on Jul. 16, 2014, which claims priority to Chinese Patent Application No. 201310355905.6, entitled "METHODS AND SYSTEMS FOR DETECTING KEYWORDS" filed on Aug. 15, 2013, both of which are incorporated by reference in their entirety.

FIELD OF THE APPLICATION

The disclosed implementations relate generally to speech recognition, and in particular, to detecting keywords in speech data including more than one language.

BACKGROUND OF THE APPLICATION

In automatic speech recognition (ASR), a keyword is a word that is associated with a certain substantive meaning, and typically represented by a noun or phrase. Conversely, a filler word normally follows keywords and assumes no substantial and meaningful role. A keyword is detected when starting and ending time points of a keyword are identified in speech data that is received by an electronic device. As a result of keyword detection, the speech data are determined by a keyword detection system to include multiple keywords and filler words. Existing keyword detection systems are mainly implemented based on two models, i.e., a garbage model and a phoneme/syllable recognition model.

In a keyword detection system based on the garbage model, a decoding network is used to identify the keywords in the received speech data, and the words used in the decoding network includes keywords and filler words that are linked according to a predetermined network structure. In accordance with the decoding network, the keyword detection system recognizes each part (e.g., frame) of the speech data as being associated with either a keyword or a filler word. Each recognized part of the speech data is further associated with a confidence score, and the keyword detection system uses the respective confidence score to determine whether the keyword is properly detected. Keywords that are determined to be properly detected are then outputted with their position information within the speech data.

On the other hand, a keyword detection system based on the phoneme/syllable recognition model detects keywords in the received speech data based on entire context of the speech data. Specifically, a phoneme or syllable network is outputted for the received speech data, and the keywords of the speech data are detected from the phoneme or syllable network using a context search technique.

When more than one language is involved in speech recognition, existing keyword detection systems normally require two independent phases, i.e., a language recognition phase and a keyword detection phase. During the language recognition phase, a specific language is determined for the received speech data, and during the subsequent keyword detection phase, the keywords are then determined by a keyword detection engine associated with this specific language. The detected keywords are then combined and outputted as a recognition result from the keyword detection system.

However, performance of the existing keyword detection system involving two or more languages is oftentimes bottlenecked by the language recognition phase. An accuracy of recognizing languages during the language recognition phase directly impacts the results of keyword detection in the keyword detection phase. In particular, accurate language recognition generally requires speech data lasting an extended length (for example, 3 to 5 seconds), and this requirement inevitably creates some obstacles for streaming keyword for subsequent keyword detection. Moreover, the existing keyword detection system is particularly inefficient when keywords of multiple language are mixed up together in one sentence (e.g., in speech data associated with "昨晚的演唱会 high 不 high"), and thereby causes inaccurate recognition of languages and keywords. Therefore, there is a need for accurately detecting keywords in speech that involves two or more languages.

SUMMARY

The above deficiencies and other problems associated with the conventional approaches of network communication are reduced or eliminated by the application disclosed below. In some embodiments, the application is implemented in an electronic device that has one or more processors, memory and one or more modules, programs or sets of instructions stored in the memory for performing multiple functions. Instructions for performing these functions may be included in a computer program product configured for execution by one or more processors.

One aspect of the application is a method that is implemented on an electronic device for recognizing a keyword in a speech. The method includes receiving a sequence of audio frames including a current frame and a subsequent frame that follows the current frame, and determining a candidate keyword for the current frame using a predetermined decoding network that includes keywords and filler words of multiple languages. The method further includes associating the audio frame sequence with a confidence score that is partially determined according to the candidate keyword, and identifying a word option for the subsequent frame using the candidate keyword and the predetermined decoding network. When the candidate keyword and the word option are associated with two distinct types of languages, the confidence score of the audio frame sequence is updated based on a penalty factor that is predetermined according to the two distinct types of languages, the word option and an acoustic model of the subsequent frame. The method further includes determining that the audio frame sequence includes both the candidate keyword and the word option by evaluating the updated confidence score according to a keyword determination criterion.

Another aspect of the application is an electronic device that includes one or more processors and memory having at least one program (including instructions) stored thereon, which when executed by the one or more processors cause the processors to perform operations to identify a keyword in a speech. The at least one program stored on the memory includes instructions for causing the electronic device to perform the operations in the method described above.

Another aspect of the application is a non-transitory computer readable storage medium that stores at least one program configured for execution by at least one processor of an electronic device. The at least one program includes instructions for causing an electronic device to perform the operations in the method described above.

Other embodiments and advantages may be apparent to those skilled in the art in light of the descriptions and drawings in this specification.

BRIEF DESCRIPTION OF THE DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. However, it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, the technical solution and advantages of the present application much clearer, the present application is further described below in detail with reference to the accompanying drawings.

Figure 1:
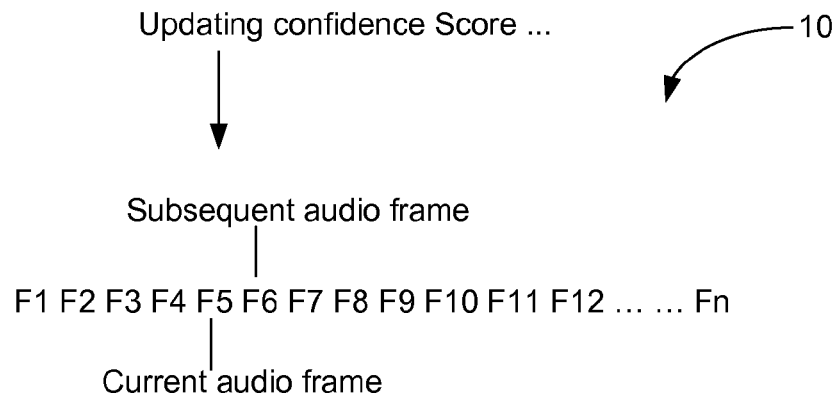
FIG. 1 illustrates exemplary speech data that include a plurality of audio frames in accordance with some embodiments of the application.

FIG. 1 illustrates exemplary speech data 10 that include a plurality of audio frames (F1, F2, ..., Fn) in accordance with some embodiments of the application. In some implementations, when an electronic device receives a continuous stream of audio signal, it digitalizes the audio signal to digital audio data (e.g., digital speech data for a received human speech). Such speech data 10 are then divided into the plurality of audio frames. In one example, each audio frame lasts for 10-20 msec, and speech data 10 includes 50-100 frames in each second. Speech data 10 originally received by the electronic device include keywords of one or more languages, and each keyword utterance optionally includes a sequence of frames. These audio frames divided from speech data 10 are then analyzed to identify these keywords in speech data 10.

In various embodiments of the application, the plurality of audio frames are consecutively processed in accordance with a predetermined decoding network, such that one or more keywords are recognized for speech data 10. In the predetermined decoding network, each keyword is predetermined to be followed by a limited number of keywords or filler words. Therefore, when a current audio frame is determined to be associated with a specific keyword, its subsequent audio frame has to be one of the limited number of keywords or filler words that are associated with the specific keyword. A subset of these limited number of keywords or filler words are selected as word options for the subsequent audio frame based on their similarity to the subsequent audio frame.

In a specific example, the current audio frame associated with a keyword, "love," is predetermined to be followed by "you," "food," "jogging," "sports," "nothing," and a plurality of other word options. In some exemplary decoding networks, the number of words following "love" is large than 100. However, when a subsequent audio frame is received, an audio model is derived from this received subsequent audio frame, and helps narrow down the word options to a subset of the word options that are predetermined to follow the keyword of "love" according to the decoding network. In some embodiments, the number of option words is narrowed down from more than 100 to less than 5.

During the course of recognizing the keywords for speech data 10, a confidence score is updated as the plurality of audio frames are consecutively associated with their corresponding keywords or filler words. This confidence score represents a similarity level of the recognized keywords and speech data 10. For example, when the current audio frame (e.g., F5) is associated with a keyword and the subsequent audio frame (e.g., F6) has not been processed yet, the confidence score has been updated to indicate the similarity of audio frames before the subsequent audio frame (e.g., F1-F5) and the corresponding words recognized based on the predetermined decoding network. Further, when more than one word option are associated with the subsequent audio frame F6, each word option is then associated with a respective confidence score calculated based on a respective audio model. In some embodiments, one of the more than one word options has a preferred confidence score, and is therefore associated with the subsequent audio frame F6. In some embodiments, a subset of the more than one word options are determined in association with the subsequent audio frame F6, when their respective confidence scores meet a predetermined keyword determination criterion. This subset of word options are further narrowed down, as more subsequent audio frames are recognized based on the decoding network. More details on processing the confidence scores are explained below with reference to FIGS. 2-6.

In some embodiments of the application, the audio frames of the received speech data 10 includes words of two or more languages, and the keywords are determined by a specific keyword recognition method that accommodates a need of recognizing two or more languages promptly, efficiently and accurately. Unlike many prior art solutions, various embodiments of this application do not involve a prolonged operation to determine a single language type for a speech prior to determining keywords in the speech. Rather, the keyword recognition method in this application uses a predetermined decoding network that couples words (e.g., keywords and filler words) from different languages together, and takes into consideration changes of the language types of the recognized words, while the confidence score is calculated and updated for consecutively recognizing the keywords associated with speech data 10. Accordingly, such a keyword recognition method improves efficiency and accuracy for recognizing keywords of multiple languages in a speech.

Figure 2:
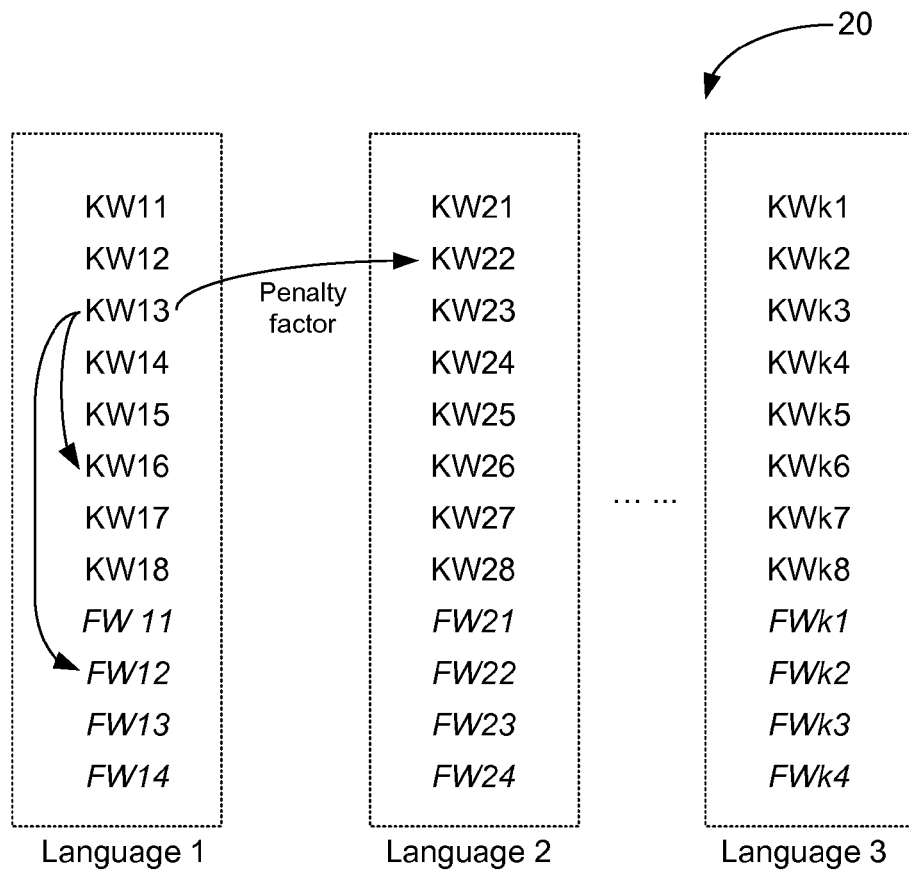
FIG. 2 illustrates an exemplary decoding network that includes keywords and filler words of multiple languages in accordance with some embodiments of the application.

FIG. 2 illustrates an exemplary decoding network 20 that includes keywords and filler words of multiple languages (e.g., languages 1 to k) in accordance with some embodiments of the application. Decoding network 20 further includes a plurality of keywords (e.g., KW11-KW18) and a plurality filler words (e.g., FW11-FW14) for each language (e.g., language 1). The number of keywords and the number of filler words vary for each language. In some embodiments, a keyword is a word that is associated with a certain substantive meaning, while a filler word is a transitory sound or word that is spoken in conversation to signal that a person has paused to think but has not yet finished speaking Examples of filler words include, but are not limited, "Umm" and "Ah."

In some implementations, a current audio frame (e.g., frame F5) is determined to be associated with a keyword (e.g., KW13) of a specific language (e.g., language 1). In accordance with decoding network 20, keyword KW13 of language 1 is optionally associated with keyword KW16 of language 1, filler word FW12 of language 1 or keyword KW22 of language 2. Therefore, a word subsequent to frame F5 (e.g., a word associated with frame F6) is selected from keyword KW16, filler word FW12 and keyword KW22. In some embodiments, both frames F5 and F6 are associated with the same keyword, and frame F6 could also be associated with keyword KW13.

In the specification of this application, the keyword associated with the current audio frame is sometimes shortened as the "candidate word."

Each option for the subsequent word frame is associated with an audio score. In some embodiments, the audio score is calculated based on a comparison of audio models of the subsequent word frame and the corresponding word option. A large audio score is associated with a higher level of similarity between the audio models of the subsequent word frame and the corresponding word option. In some embodiments, the respective audio score is used to update the confidence score associate with this keyword recognition process. In one example, the confidence score is an accumulative score of the audio scores of audio frames that have been recognized (e.g., frames F1-F6).

In some implementations, when the word option (e.g., KW22) for the subsequent audio frame is associated with a distinct language type from that of the current audio frame, the confidence score is scaled by a penalty factor before it is updated with the corresponding audio score of the word option. Therefore, the confidence score is represented for the word options associated with the subsequent audio frame as follows:

$$CS(Fs) = CS(Fc) + AS(WO) \quad (1)$$

or $$CS(Fs) = CS(Fc) \times \delta(Lc, Ls) + AS(WO) \quad (2)$$

wherein CS(Fc) and CS(Fs) are the confidence scores associated with the current and subsequent audio frames, respectively; AS(WO) is the audio score associated with the corresponding word option; and δ(Lc, Ls) is the penalty factor associated with two distinct language types of the keyword associated with the current audio frame and the corresponding word option. Equation (1) is applied when the keyword associated with the current audio frame and the corresponding word option for the subsequent audio frame are associated with the same language, while equation (2) is applied when they are associated with two distinct languages.

In some embodiments, the penalty factor is predetermined according to a predetermined penalty factor table. Table 1 represents an exemplary penalty factor table in accordance with some embodiments. The penalty factor table includes a plurality of penalty factors each associated with two different languages, and the penalty factor used for updating the confidence score of the audio frame sequence is identified by looking up the penalty factor table based on the two distinct language types of the keyword associated with the current audio frame and the corresponding word option. In some embodiments, the magnitude of the penalty factors indicates a relative probability of using words of two distinct languages together. For example, a Chinese keyword is most probably followed by another Chinese word, and therefore, a penalty factor of 1 (i.e., no penalty) is associated with a situation that a Chinese word option for a subsequent audio frame follows a Chinese keyword associated with a current audio frame. On the other hand, a Chinese keyword is less probably followed by an English, Japanese or Russian word, and therefore, a penalty factor of 0.9, 0.7 or 0.5 is associated with a situation that an English, Japanese or Russian word option follows a Chinese keyword, respectively.

TABLE 1

Penalty Factor Table

|  | Chinese | English | Japanese | Russian |
|---|---|---|---|---|
| Chinese | 1 | 0.9 | 0.7 | 0.5 |
| English | 0.9 | 1 | 0.8 | 0.7 |
| Japanese | 0.7 | 0.7 | 1 | 0.5 |
| Russian | 0.6 | 0.7 | 0.6 | 1 |

After the confidence score is updated with the penalty factors and the audio scores of the word options, one or more word options are selected for the subsequent audio frame according to a predetermined keyword determination criterion. In some embodiments, according to the keyword determination criterion, the word option that is associated with the largest confidence score is determined as a keyword associated with the subsequent audio frame. Then, the keyword recognition process continues to process the next audio frame, e.g., frame F7, following the subsequent audio frame, until the last audio frame in the speech data, e.g., Fn, is processed and associated with a keyword.

In some implementations, according to the keyword determination criterion, the confidence score has to be larger than a threshold value. However, in some situations, more than one word option satisfies such a keyword determination criterion, and thus, are associated with audio frame F6. The keyword recognition process continues to process the next audio frame, e.g., frame F7, based on the more than one word option for frame F6. Some of the more than one word option for frame F6 may be eliminated when corresponding word options for frame F7 causes the confidence score to fall below the threshold value. Therefore, in some implementations, a distance between a current audio frame and an earlier audio frame determines a recognition certainty of this earlier audio frame. A larger distance is associated with a higher certainty of determining a keyword for the corresponding earlier audio frame, while on the other hand, a smaller distance could be associated with several word options that are unable to be narrowed down for an earlier audio frame closely preceding the current audio frame.

Figure 3:
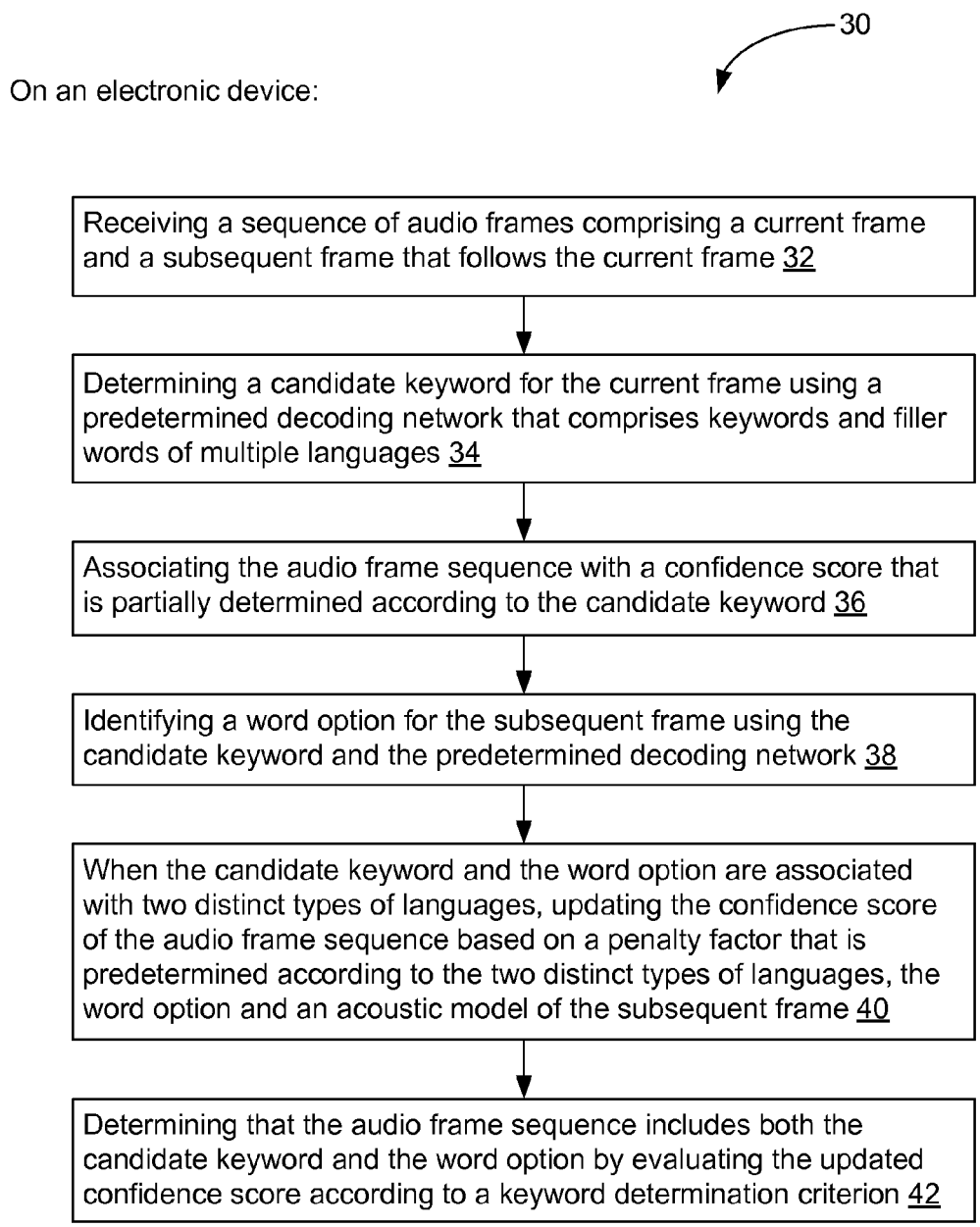
FIG. 3 illustrates a flow chart representing a method for recognizing a keyword in a speech in accordance with some embodiments of the application.

FIG. 3 illustrates a flow chart representing a method 30 for recognizing a keyword in a speech in accordance with some embodiments of the application. Method 30 is, optionally, governed by instructions that are stored in a non-transitory computer readable storage medium and that are executed by one or more processors of a host system. Each of the operations shown in FIG. 3 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 30 may be combined and/or the order of some operations may be changed.

Keyword recognition method 30 is implemented on an electronic device that receives (32) a sequence of audio frames. The audio frame sequence includes a current frame and a subsequent frame that follows the current frame. A candidate keyword is determined (34) for the current frame using a predetermined decoding network that includes keywords and filler words of multiple languages.

In some embodiments, the predetermined decoding network is associated with two or more languages of English, Chinese, Japanese, Russian, French, German and the like, and includes a subset of keywords and a subset of filler words for each of the two or more languages. Further, in some embodiments, each keyword of the predetermined decoding network includes one or more triphones.

In some embodiments, in accordance with a decoding structure of the predetermined decoding network, each keyword in the predetermined decoding network is associated with at least one word that is used together with the respective keyword in real speech and included in the decoding network. In some situations, in accordance with the decoding structure, each keyword in a subset of keywords and the respective at least one word that is used together with the respective keyword originate from two distinct languages. For example, a first keyword is "我" in Chinese, and is followed with a second keyword of "No" in English according to a specific decoding structure.

After the candidate keyword is determined, the audio frame sequence is associated (36) with a confidence score that is partially determined according to the candidate keyword. The electronic device then identifies (38) a word option for the subsequent frame using the candidate keyword and the predetermined decoding network. When the candidate keyword and the word option are associated with two distinct types of languages, the confidence score of the audio frame sequence is updated (40) based on a penalty factor that is predetermined according to the two distinct types of languages, the word option and an acoustic model of the subsequent frame.

As explained above with reference to FIG. 2, in some embodiments, a penalty factor table is established to include a plurality of penalty factors, and each penalty factor is associated with two different languages. The penalty factor used for updating the confidence score of the audio frame sequence is identified by looking up the penalty factor table based on the two distinct language types of the candidate keyword and the word option. In some implementations, the confidence score of the audio frame sequence is scaled down by the corresponding penalty factor that is predetermined according to the two distinct types of languages. In some embodiments, the confidence score is an accumulative score based on audio scores of the current frame and all the frames ahead of the current frame, and the updated confidence score further includes the audio score of the subsequent frame determined based on the word option.

After updating the confidence score of the audio frame sequence, the electronic device determines (42) that the audio frame sequence includes both the candidate keyword and the word option by evaluating the updated confidence score according to a keyword determination criterion. In a specific example, in accordance with the keyword determination criterion, the confidence score of the audio frame sequence is larger than a keyword threshold value.

In some embodiments, a plurality of candidate keywords are determined for the current frame of the audio frame sequence, and the aforementioned candidate keyword is one of the plurality of candidate keywords. Each candidate keyword is associated with at least one word option according to the predetermined decoding network. A first subset of the candidate keywords are excluded from the keywords recognized from the audio frame sequence, particularly because their respective at least one word options fail to satisfy the keyword recognition criterion.

On the other hand, a second subset of the candidate keywords are determined to be included in the audio frame sequence together with their respective at least one word options based on the keyword determination criterion. Specifically, the corresponding confidence score of the audio frame sequence satisfies the keyword determination criterion for each candidate keyword in the first subset of the candidate keywords and its respective at least one word option. In one example, after the second subset of the candidate keywords are determined to be included in the audio frame sequence together with their respective at least one word options, the corresponding confidence score is updated and is determined to exceed a keyword threshold value in accordance with the keyword determination criterion. One of those skilled in the art knows that this determination of the second subset of the candidate keywords is rather tentative, because when other word options are identified in the decoding network for frames subsequent to the subsequent frame, the confidence score needs to be updated and may fail to satisfy the keyword determination criterion.

Further, in some embodiments, the subsequent frame in the above keyword recognition method 30 is the last frame of the audio frame sequence, and in accordance with the keyword determination criterion, a candidate keyword that is associated with a preferred confidence score, e.g., a largest confidence score, is selected from the plurality of candidate keywords as a keyword associated with the current frame of the audio frame sequence.

In some embodiments, in accordance with the keyword determination criterion, each of the plurality of candidate keywords is associated with a respective confidence score of the audio frame sequence, and the respective confidence score is larger than a keyword threshold value.

In some implementations of the present application, the predetermined decoding network is established based on a specific decoding structure, and the keywords and filler words of multiple languages are grouped according to their language types. The decoding structure includes a start node, an end node, language nodes, keyword nodes, filler nodes, and triphone nodes for each keyword node. Therefore, to establish the predetermined decoding network, the electronic device creates a start node and an end node and a plurality of language nodes each representing a type of language, and links each language node with the start node. Each language node is further associated with a subset of respective keywords and a subset of respective filler words both originating from the corresponding language.

For each keyword, the respective keyword is converted to a sequence of tripohones, and a respective triphone node is created for each triphone of the sequence of triphones of the respective keyword. Then, the triphone nodes of the sequence of triphones are linked together to form a sequence of triphone nodes including a head triphone node and a tail triphone node, and a respective head triphone node is linked to a corresponding language node and a respective tail triphone node to the end node. On the other hand, for each filler word, a respective filler node is created and further coupled between the corresponding language node and the end node. Each filler word is linked between the start node and the end node.

In some embodiments, the candidate keyword and the word option are determined to be associated with two distinct types of languages, when one of the plurality of language nodes is linked between the candidate keyword and the word option on the predetermined decoding network.

In some embodiments, in accordance with a decoding structure of the predetermined decoding network, each keyword in the decoding network is linked on the predetermined decoding network to at least one word that is used together with the respective keyword in real speech.

It should be understood that the particular order in which the operations in FIG. 3 have been described are merely exemplary and are not intended to indicate that the described order is the only order in which the operations could be performed. One of ordinary skill in the art would recognize various ways to create auto-reply messages as described herein. Additionally, it should be noted that details of other processes described herein with respect to method 200 (e.g., FIG. 5) are also applicable in an analogous manner to method 30 described above with respect to FIG. 3. For brevity, these details are not repeated here.

Figure 4:
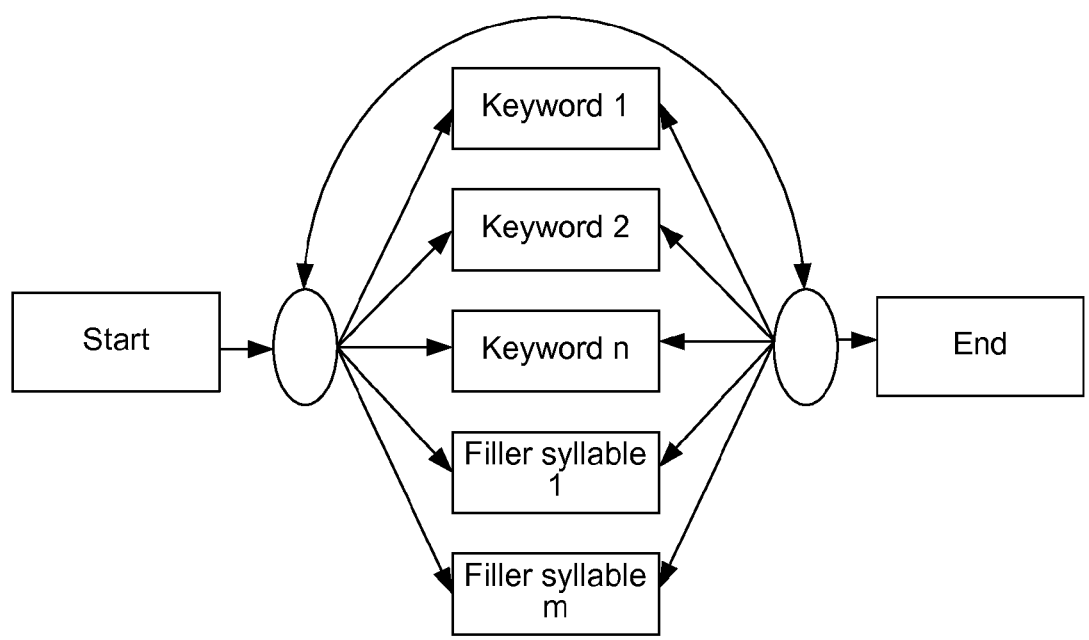
FIG. 4 illustrates another exemplary decoding network in accordance with some embodiments of the application.

FIG. 4 illustrates another exemplary decoding network 100 in accordance with some embodiments of the application. As shown in FIG. 4, when decoding network 100 is used by a keyword recognition system based on a garbage network in the prior art, acoustic context expansion needs to be further performed on keywords and filler syllables, and an ultimate decoding space uses an HMM state as a graph node. The keywords are described by using finer acoustic models, and context-dependent triphone HMM modeling is generally used. The models are referred to as foreground models. On the other hand, the filler syllables represent a non-keyword part in a speech section, and coarser acoustic models are generally used, for example, phonemic language models after clustering. These models are referred to as background models.

However, in the existing multilingual keyword recognition technology, language recognition generally requires an audio signal having at least a certain length (for example, 3-5 seconds), which may bring about some obstacles to streaming keyword recognition in actual applications. In addition, the keyword recognition technology in the prior art cannot deal with a situation where multiple languages are mixed.

In some embodiments of the present application, a new keyword recognition solution is proposed mainly based on a framework which is further established based on a garbage network. When a decoding space is constructed for the proposed keyword recognition solution, language information is directly embedded into the decoding space, so as to effectively avoid the influence on streaming detection at the language recognition stage; in the decoding process of the embodiments of the present application. A token-passing strategy may be adjusted by using the language information, and a multilingual keyword recognition task can be completed with a single detection engine.

Compared with the existing keyword recognition system based on a garbage network, this proposed technical solution in the present application mainly has two improvements: (1) construction of a multilingual decoding network which includes language information; and (2) application of a multilingual keyword recognition algorithm for the multilingual decoding network. In the decoding process, a token score is adjusted through judgment on the language information, and a penalty factor for language conversion is introduced.

As used in the description of the application and the appended claims, the term of "token score" is equivalent to the term of "confidence score," and these two terms are used in an exchangeable manner.

Figure 5:
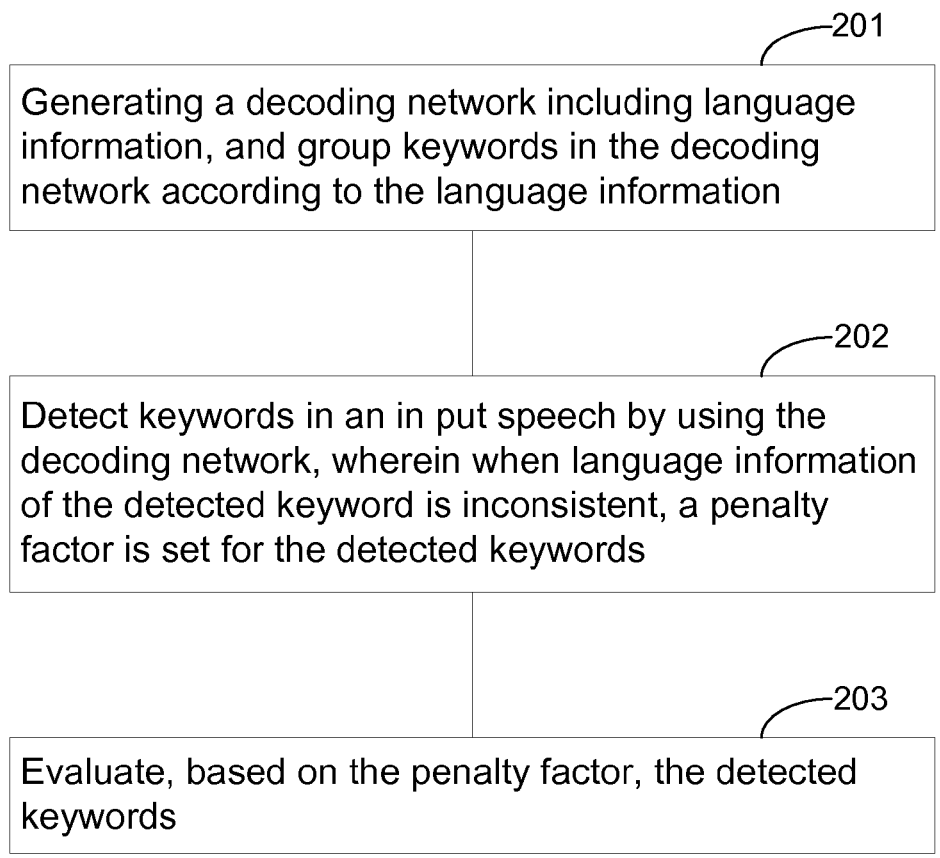
FIG. 5 illustrates a flow chart representing a keyword detection method in accordance with some embodiments of the application.

FIG. 5 illustrates a flow chart representing a keyword recognition method 200 in accordance with some embodiments of the application. Method 200 is, optionally, governed by instructions that are stored in a non-transitory computer readable storage medium and that are executed by one or more processors of a host system. Each of the operations shown in FIG. 5 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 200 may be combined and/or the order of some operations may be changed.

At Step 201, a decoding network is generated and includes language information. Keywords are grouped in the decoding network according to the language information. In the process of generating the decoding network, a start node and an end node may be initialized herein, and the following steps are performed for each language information L, where i is a language number:

constructing a language node $N_{Li}$, and constructing a side from the start node to $N_{Li}$;

loading a keyword list and a filler syllable list which are corresponding to the language information $L_i$;

performing the following actions for each keyword $K_j$ in the keyword list, where j is a keyword number:

converting the keyword $K_j$ to triphone sequences, and constructing a node for each triphone to form a node sequence; sequentially constructing sides between the node sequences; constructing a side from the language node $N_{Li}$ to a first node in the node sequences and a side from a final node in the node sequences to the end node;

performing the following actions for each filler syllable $F_k$ in the filler syllable list, where k is a filler syllable number:

constructing a node $N_{Fk}$ corresponding to the filler syllable $F_k$;

constructing a side from the language node $N_{Li}$ to $N_{Fk}$ and a side from $N_{Fk}$ to the end node;

constructing a side from the end node to the start node; and establishing the decoding network.

At Step 202, keywords are detected in an input speech by using the decoding network. In some embodiments, when the language information of the detected keywords is inconsistent, a penalty factor is set for the detected keywords. In some embodiments involving a token propagation process of keyword detection, when a language state node is met, whether language information on the language state node matches language information on the token is determined by comparing. If the two pieces of information do not match, a penalty factor is set for the token score.

More preferably, a penalty factor table corresponding to language category differences is preset. In some embodiments, when the language information of the detected keywords is inconsistent, the penalty factor table is retrieved from the penalty factor table to determine a penalty factor set for the detected keywords.

At Step 203, the detected keywords are evaluated based on the penalty factor.

In some embodiments, a keyword threshold may be preset herein, and confidence of the detected keywords is calculated according to a confidence algorithm and the penalty factor. The keywords are removed when the calculated confidence is lower than the keyword threshold.

In some embodiments, a penalty factor is added to the filler syllables, so that the keywords can be recognized more easily, thereby improving a recall rate of detection. Moreover, if some keywords are more important for a detection task, a greater weighting factor may be given to the keywords, while a smaller weighting factor is given to other keywords; and a score threshold of the token may be set in the token passing process, thereby speeding up a decoding speed.

It should be understood that the particular order in which the operations in FIG. 5 have been described are merely exemplary and are not intended to indicate that the described order is the only order in which the operations could be performed. One of ordinary skill in the art would recognize various ways to create auto-reply messages as described herein. Additionally, it should be noted that details of other processes described herein with respect to method 30 (e.g., FIG. 3) are also applicable in an analogous manner to method 200 described above with respect to FIG. 5. For brevity, these details are not repeated here.

Figure 6:
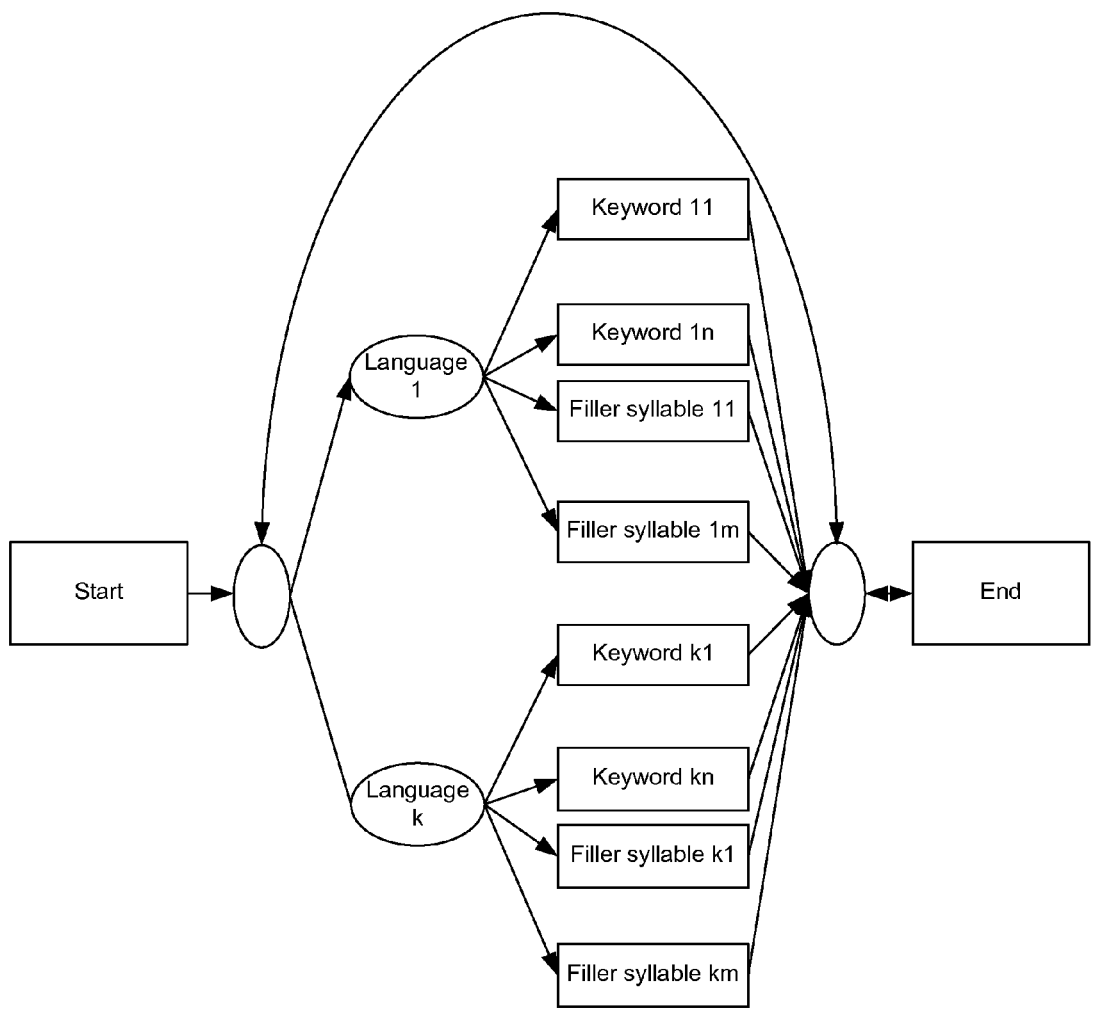
FIG. 6 illustrates another exemplary decoding network that includes keywords and filler words of multiple languages in accordance with some embodiments of the application.

FIG. 6 illustrates another exemplary decoding network 300 that includes keywords and filler words of multiple languages in accordance with some embodiments of the application. It can be seen from FIG. 6 that, keywords and filler syllables are grouped according to language information in the decoding network. Language state nodes corresponding to languages of the keywords and the filler syllables are added before each keyword and each filler syllable. For example, Language Node 1 corresponds to keywords 11 to 1n of the language 1, and filler syllables 11 to 1m of the language 1. Likewise, Language Node k corresponds to keywords k1 to kn of the language k, and filler syllables k1 to km of the language k.

In some exemplary token propagation processes, once a language state node is met, whether language information on the node matches language information on the token should be determined by comparing, and if the two pieces of information do not match, the token score must be scaled down to some extent.

In some implementations, multilingual decoding network 300 is established by the following steps:

At step one, a start node $N_{Start}$ and an end node $N_{End}$ are initialized;

At step two, a multilingual list is checked according to the following sub-steps, [2.1]-[2.4] These sub-steps are sequentially performed for each language $L_i$, and the sub-step [2.3] and [2.4] further includes sub-steps [2.3.1]-[2.3.4] and sub-steps [2.4.1]-[2.4.2], respectively. Specifically, sub-steps [2.1]-[2.4] include:

[2.1] constructing a language node $N_{Li}$, and constructing a side from the start node $N_{Start}$ to $N_{Li}$;

[2.2] loading a keyword list and a filler syllable list which are corresponding to a language $L_i$;

[2.3] performing the following actions for each keyword $K_j$ in the keyword list, which optionally comprises:

[2.3.1] converting the keyword $K_j$ to triphone sequences $T_1, T_2, \ldots, T_p$;

[2.3.2] constructing a node for each triphone, where node sequences are recorded as $N_1, N_2, \ldots, N_p$;

[2.3.3] sequentially constructing sides from $N_1$ to $N_2$, from $N_2$ to $N_3$, \ldots, and from $N_{p-1}$ to $N_p$;

[2.3.4] constructing a side from the language node $N_{Li}$ to $N_1$ and a side from $N_p$ to the end node $N_{End}$;

[2.4] performing the following actions on each filler syllable $F_j$ in the filler syllable list, which optionally comprises:

[2.4.1] constructing a node $N_{Fj}$ corresponding to the filler syllable $F_j$;

[2.4.2] constructing a side from the language node $N_{Li}$ to $N_{Fj}$ and a side from $N_{Fj}$ to the end node $N_{End}$;

At step three, after the multilingual list is checked, a side is constructed from the end node $N_{End}$ to the start node $N_{Start}$.

At step four, a constructed multilingual decoding network is established.

In some embodiments, during multilingual keyword detection, the following steps may be sequentially performed, where [1] is step one; [2] is step two; [3] is step three; [4] is step four; [5] is step five; and [6] is step six. Moreover, [2] may include a sub-step [2.1]; the sub-step [2.1] includes [2.1.1], [2.1.2], [2.1.3] and [2.1.4]. Steps [1]-[6] are listed as follows:

[1] give the start node an initial active token, where the score is initialized to 1;

[2] read next-frame speech data, and perform the following steps, until all speech data has been processed:

[2.1] perform the following steps for each active token $T_k$, until all active tokens have been processed:

[2.1.1] transfer $T_k$ from a current state node $S_i$ forward along a side of a word lattice, where a new node is set as $S_j$, and a new token is $T_p$;

[2.1.2] if $S_j$ is a language node, update Score($T_p$) of the token $T_p$ according to Score($T_p$)=δ(Lang($T_p$),Lang($S_j$))×Score($T_k$), where Score($T_k$) is accumulation of acoustic model scores on all node paths that the token passes through in a process of transfer from the start node to the node $S_i$, then proceed to [2.1.1] to continue transferring the token forward; otherwise, perform [2.1.3]; where Lang(•) is a function for obtaining a node or language information of the token, and δ(•) is a penalty function, which is used for defining punishment on the score in conversion from one language to another language, and takes the value of 1 when the language information is consistent;

[2.1.3] update the score of the token $T_p$ by using acoustic models according to current-frame speech data;

[2.1.4] judge whether the new token $T_p$ is active according to a pruning strategy;

[3] record an active token scoring highest in all the active tokens arriving at the end node as $T_{final}$;

[4] go back to acquire path information of $T_{final}$, and return all the keywords on a path;

[5] evaluate each detected keyword by using a confidence algorithm; and

[6] output an ultimate detected keyword list.

In some embodiments, the penalty function δ(•) is indicated with a two-dimensional table (e.g., Table 1). Specifically, in this example, the penalty function defines the penalty factors associated with four languages, i.e., Chinese, English, Japanese and Russian.

In some embodiments, there are 3 active tokens (T1, T2, T3) at a certain decoding time, corresponding information is as follows:

TABLE 2

|    | Language | Score |
|----|----------|-------|
| T1 | Chinese  | 50    |
| T2 | Japanese | 30    |
| T3 | Chinese  | 20    |

During search in a network, there are 5 nodes (S1, S2, S3, S4, S5) to which the tokens can be transferred forward along a network path, and corresponding information is as follows (the score of the final column is an acoustic model score of next-frame speech data on the node).

TABLE 3

|    | Type          | Language | Score |
|----|---------------|----------|-------|
| S1 | Language node | English  | 0     |
| S2 | Ordinary node | Chinese  | 6     |
| S3 | Language node | Russian  | 0     |
| S4 | Ordinary node | Japanese | 9     |
| S5 | Ordinary node | Chinese  | 5     |

A corresponding relationship between the tokens and states is as follows: T1 may be transferred forward to S1 and S3, T2 may be transferred to S4, T3 may be transferred to S2 and S5, and upon completion of transfer, tokens on corresponding nodes are as follows (it should be noted that, after being transferred to a language node, a token needs to be continuously transferred, so as to complete processing on the speech data).

TABLE 4

|    | S1 | S2 | S3 | S4 | S5 |
|----|----|----|----|----|----|
| T1 | T4 |    | T5 |    |    |
| T2 |    |    |    | T6 |    |
| T3 |    | T7 |    |    | T8 |

Information of each token may be updated in the following manner:

TABLE 5

|    | Language          | Score                                    |
|----|-------------------|------------------------------------------|
| T4 | Chinese => English | δ(Chinese, English) × Score(T1) = 45    |
| T5 | Chinese => Russian | δ(Chinese, Russian) × Score(T1) = 25    |
| T6 | Japanese          | Score(T2) + Score(S4) = 39              |
| T7 | Chinese           | Score(T3) + Score(S2) = 26              |
| T8 | Chinese           | Score(T3) + Score(S5) = 25              |

The definition of the penalty function δ(•) may be formulated with reference to historical paths of the token, for example, the number of times the language type in the paths changes.

Although the above describes a specific example of the penalty function in detail, persons skilled in the art may realize that such description is merely exemplary, but is not intended to limit the embodiments of the present application.

Based on the above detailed analysis, an embodiment of the present application further provides a keyword detection system.

Figure 7A:
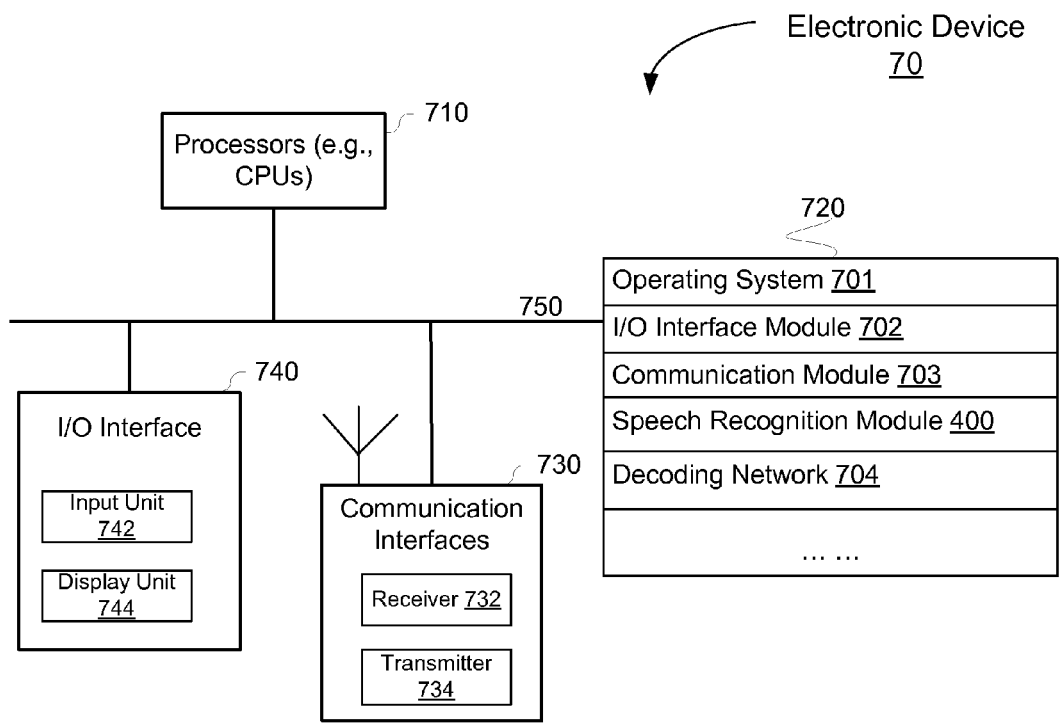
FIG. 7A illustrates a block diagram of an electronic device that detects keywords in a speech in accordance with some embodiments of the application.

FIG. 7A illustrates a block diagram of an electronic device 70 that detects keywords in a speech in accordance with some embodiments of the application. In some implementations, server system 14 at least includes one or more processors 710 (e.g., central processing units) and a memory 720 for storing data, programs and instructions for execution by one or more processors 710. In some implementations, server system 14 further includes one or more communication interfaces 730, an input/output (I/O) interface 740, and one or more communication buses 750 that interconnect these components.

In some embodiments, I/O interface 740 includes an input unit 742 and a display unit 744. Examples of input unit 742 include a keyboard, a mouse, a touch pad, a game controller, a function key, a trackball, a joystick, a microphone, a camera and the like. Additionally, display unit 744 displays information that is inputted by the user or provided to the user for review. Examples of display unit 744 include, but are not limited to, a liquid crystal display (LCD) and an organic light-emitting diode (OLED) display. In some implementations, input unit 742 and display unit 744 are integrated on a touch-sensitive display that displays a graphical user interface (GUI).

In some embodiments, communication buses 530 include circuitry (sometimes called a chipset) that interconnects and controls communications between system components. In some embodiments, communication interfaces 730 further include a receiver 732 and a transmitter 734.

In some embodiments, memory 720 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 720 includes one or more storage devices remotely located from the one or more processors 710. In some embodiments, memory 720, or alternatively the non-volatile memory device(s) within memory 720, includes a non-transitory computer readable storage medium.

In some embodiments, memory 720 or alternatively the non-transitory computer readable storage medium of memory 720 stores the following programs, modules and data structures, instructions, or a subset thereof:

Operating System 701 that includes procedures for handling various basic system services and for performing hardware dependent tasks;

I/O interface module 702 that includes procedures for handling various basic input and output functions through one or more input and output devices, wherein I/O interface module 702 further includes an interface display module that controls displaying of a graphical user interface;

Communication module 703 that is used for connecting server system 14 to other computational devices (e.g., servers and client devices), via one or more network communication interfaces 750 (wired or wireless) and one or more communication networks, such as the Internet, other wide area networks, local area networks, metropolitan area networks, and so on;

Speech recognition module 400 that recognize a speech based on a predetermined decoding network 704 including keywords and fill words of multiple languages and stored in memory 720; and Decoding network 704.

More details on speech recognition module 400 are also explained above with reference to FIGS. 1-6.

Figure 7B:
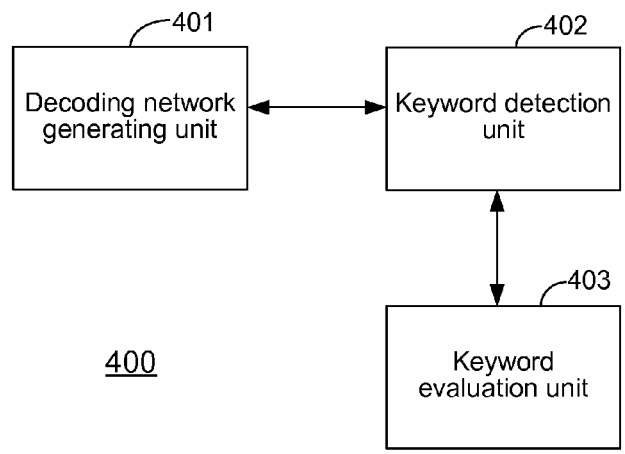
FIG. 7B illustrates a block diagram of a speech recognition module of the electronic device shown in FIG. 7A in accordance with some embodiments of the application.

FIG. 7B illustrates a block diagram of a speech recognition module 400 of the electronic device shown in FIG. 7A in accordance with some embodiments of the application. As shown in FIG. 5, the apparatus includes a decoding network generating unit 501, a keyword detection unit 502 and a keyword evaluation unit 503. Decoding network generating unit 501 is used for generating a decoding network including language information, and grouping keywords in the decoding network according to the language information. Keyword detection unit 502 is used for detecting keywords in an input speech by using the decoding network, where when language information of the detected keywords is inconsistent, a penalty factor is set for the detected keywords. Keyword evaluation unit 503 is used for evaluating, based on the penalty factor, the detected keywords.

In some embodiments, keyword evaluation unit 503 is used for presetting a keyword threshold, and calculating confidence of the detected keywords according to a confidence algorithm and the penalty factor, where the keywords are removed when the calculated confidence is lower than the keyword threshold.

In some embodiments, the decoding network generating unit 501 is used for initializing a start node and an end node, and performing the following steps for each language information $L_i$, where i is a language number:

constructing a language node $N_{Li}$, and constructing a side from the start node to $N_{Li}$;

loading a keyword list and a filler syllable list which are corresponding to the language information $L_i$;

performing the following actions for each keyword Kj in the keyword list, where j is a keyword number:

converting the keyword Kj to triphone sequences, and constructing a node for each triphone to form a node sequence; sequentially constructing sides between the node sequences; constructing a side from the language node NLi to a first node in the node sequences and a side from a final node in the node sequences to the end node;

performing the following actions for each filler syllable Fk in the filler syllable list, where k is a filler syllable number:

constructing a node NFk corresponding to the filler syllable Fk;

constructing a side from the language node NLi to NFk and a side from NFk to the end node;

constructing a side from the end node to the start node; and outputting the decoding network.

In some embodiments, keyword detection unit 502 is used for, in a token propagation process of keyword detection, when a language state node is met, determining, by comparing, whether language information on the language state node matches language information on the token, and if the two pieces of information do not match, setting a penalty factor for the token score.

In some embodiments, keyword detection unit 502 is used for presetting a penalty factor table corresponding to language category differences; and when the language information of the detected keywords is inconsistent, retrieving the penalty factor table to determine a penalty factor set for the detected keywords.

A user may perform keyword detection processing on various terminals, and the terminals may include, but are not limited to: feature phones, smart phones, handheld computers, personal computers (PCs), tablet PCs or personal digital assistants (PDAs) and the like.

Although the above lists a specific example of the terminals in detail, persons skilled in the art may realize that, the list is merely for illustration, but is not intended to limit the protection scope of the present application. A browser may specifically include Microsoft Internet Explorer, Mozilla's Firefox, Apple's Safari, Opera, Google Chrome, GreenBrowser and other browsers.

Although the above lists some common browsers in detail, persons skilled in the art may realize that, the embodiments of the present application are not limited to the browsers, but may be applied to any application (App) that can be used for displaying a webpage server or a file in a file system and allows a user to interact with the file, and the applications may be a variety of currently common browsers, or may be any other applications having a webpage browsing function.

It is noted that the keyword detection method and apparatus proposed in the embodiments of the present application are not limited to the embodiments in this application, and can also be implemented in many other forms.

For example, a certain standardized application interface may be followed, the keyword detection method is written as a plug-in to be installed to PCs, mobile terminals and the like, or may be packaged as an application for the user to download and use. When it is written as a plug-in, it may be implemented as many plug-in forms such as ocx, dll and cab. The keyword detection method proposed in the embodiments of the present application may also be implemented through specific technologies such as a Flash plug-in, a RealPlayer plug-in, an MMS plug-in, an MIDI stave plug-in and an ActiveX plug-in.

The keyword detection method proposed in the embodiments of the present application may be stored on various storage media in a storage manner of instruction or instruction set storage. The storage media include, but are not limited to: a floppy disk, a CD, a DVD, a hard disk, a flash memory, a U disk, a CF card, an SD card, an MMC card, an SM card, a memory stick, an xD card and the like.

In addition, the keyword detection method proposed in the embodiments of the present application may also be applied to storage media based on NAND flash, such as a U disk, a CF card, an SD card, an SDHC card, an MMC card, an SM card, a memory stick, an xD card and the like.

In summary, in the embodiments of the present application, a decoding network including language information is generated, and keywords are grouped according to the language information in the decoding network. Keywords in an input speech are detected by using the decoding network. In some embodiments, when language information of the detected keywords is inconsistent, a penalty factor is set for the detected keywords, and the detected keywords are evaluated based on the penalty factor. In various embodiments of this application, the language information is directly constructed in the decoding network, and keywords in different languages are grouped according to the language information. Such arrangement effectively avoids the impact of language recognition on keyword detection, and makes keyword detection in a speech sentence where multiple languages are mixed more efficient and accurate.

In addition, in the decoding process of the embodiments of the present application, a token score is adjusted through judgment on the language information, and a penalty function for language conversion is introduced, so that a multilingual keyword detection task can be completed only with a single detection engine.

The above descriptions are merely preferred embodiments of the present application, but not intended to limit the present application. Any modification, equivalent replacement, and improvement made without departing from the spirit and principle of the present application shall fall within the protection scope of the present application.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the application herein is for the purpose of describing particular embodiments only and is not intended to be limiting of the application. As used in the description of the application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the application to the precise forms disclosed. Many modifications and variations are possible in view of the above teachings. The embodiments were chosen and described in order to best explain the principles of the application and its practical applications, to thereby enable others skilled in the art to best utilize the application and various embodiments with various modifications as are suited to the particular use contemplated.

What is claimed is:

1. A method of recognizing a keyword in a speech, comprising:
on an electronic device:
receiving a sequence of audio frames comprising a current frame and a subsequent frame that follows the current frame;
determining a candidate keyword for the current frame using a predetermined decoding network that comprises keywords and filler words of multiple languages,
associating the audio frame sequence with a confidence score that is partially determined according to the candidate keyword;
identifying a word option for the subsequent frame using the candidate keyword and the predetermined decoding network;
when the candidate keyword and the word option are associated with two distinct types of languages, updating the confidence score of the audio frame sequence based on a penalty factor that is predetermined according to the two distinct types of languages, the word option and an acoustic model of the subsequent frame; and
determining that the audio frame sequence includes both the candidate keyword and the word option by evaluating the updated confidence score according to a keyword determination criterion.

2. The method of claim 1, wherein a plurality of candidate keywords, including the candidate keyword, are determined for the current frame of the audio frame sequence, and each candidate keyword is associated with at least one word option, and wherein a subset of the plurality of candidate keyword are determined to be included in the audio frame sequence together with their respective at least one word options based on the keyword determination criterion.

3. The method of claim 2, wherein the subsequent frame is the last frame of the audio frame sequence, and in accordance with the keyword determination criterion, a candidate keyword that is associated with a preferred confidence score among is selected from the plurality of candidate keywords as a keyword associated with the current frame of the audio frame sequence.

4. The method of claim 2, wherein in accordance with the keyword determination criterion, each of the plurality of candidate keywords is associated with a respective confidence score of the audio frame sequence, and the respective confidence score is larger than a keyword threshold value.

5. The method of claim 2, wherein after the subset of the candidate keywords are determined to be included in the audio frame sequence together with their respective at least one word options, the corresponding confidence score is updated and is determined to exceed a keyword threshold value in accordance with the keyword determination criterion.

6. The method of claim 1, wherein in accordance with the keyword determination criterion, the confidence score of the audio frame sequence is larger than a keyword threshold.

7. The method of claim 1, wherein the predetermined decoding network is associated with two or more languages of English, Chinese, Japanese, Russian, French, German and the like, and includes a subset of keywords and a subset of filler words for each of the two or more languages.

8. The method of claim 1, wherein each keyword of the predetermined decoding network comprises one or more triphones.

9. The method of claim 1, wherein in accordance with a decoding structure of the predetermined decoding network, each keyword in the predetermined decoding network is associated with at least one word that is used together with the respective keyword in real speech and included in the decoding network.

10. The method of claim 9, wherein in accordance with a decoding structure of the predetermined decoding network, each keyword in a subset of keywords and the respective at least one word that is used together with the respective keyword originate from two distinct languages.

11. The method of claim 1, further comprising:
establishing a penalty factor table including a plurality of penalty factors each associated with two different languages, wherein the penalty factor used for updating the confidence score of the audio frame sequence is identified by looking up the penalty factor table based on the two distinct language types of the candidate keyword and the word option.

12. The method of claim 1, further comprising:
establishing the predetermined decoding network, wherein the keywords and filler words of multiple languages are grouped according to their language types, further comprising:
creating a start node and an end node;
creating a plurality of language nodes each representing a type of language;
linking each language node with the start node;
associating each language node with a subset of respective keywords and a subset of respective filler words both originating from the corresponding language;
for each keyword:
converting the respective keyword to a sequence of tripohones,
creating a respective triphone node for each triphone of the sequence of triphones of the respective keyword,
linking the triphone nodes of the sequence of triphones together to form a sequence of triphone nodes including a head triphone node and a tail triphone node, and
linking a respective head triphone node to a corresponding language node and a respective tail triphone node to the end node;
for each filler word, creating a respective filler node and coupling the respective filler node between the corresponding language node and the end node; and
linking the start node and the end node.

13. The method of claim 12, wherein the candidate keyword and the word option are determined to be associated with two distinct types of languages, when one of the plurality of language nodes is linked between the candidate keyword and the word option on the predetermined decoding network.

14. The method of claim 12, wherein in accordance with a decoding structure of the predetermined decoding network, each keyword in the decoding network is linked on the predetermined decoding network to at least one word that is used together with the respective keyword in real speech.

15. An electronic device, comprising:
one or more processors; and
memory having instructions stored thereon, which when executed by the one or more processors cause the processors to perform operations comprising:
receiving a sequence of audio frames comprising a current frame and a subsequent frame that follows the current frame;
determining a candidate keyword for the current frame using a predetermined decoding network that comprises keywords and filler words of multiple languages,
associating the audio frame sequence with a confidence score that is partially determined according to the candidate keyword;
identifying a word option for the subsequent frame using the candidate keyword and the predetermined decoding network;
when the candidate keyword and the word option are associated with two distinct types of languages, updating the confidence score of the audio frame sequence based on a penalty factor that is predetermined according to the two distinct types of languages, the word option and an acoustic model of the subsequent frame; and
determining that the audio frame sequence includes both the candidate keyword and the word option by evaluating the updated confidence score according to a keyword determination criterion.

16. The electronic device of claim 15, wherein in accordance with the keyword determination criterion, the confidence score of the audio frame sequence is larger than a keyword threshold.

17. The electronic device of claim 15, wherein the operations performed by the processors further comprise:
establishing a penalty factor table including a plurality of penalty factors each associated with two different languages, wherein the penalty factor used for updating the confidence score of the audio frame sequence is identified by looking up the penalty factor table based on the two distinct language types of the candidate keyword and the word option.

18. The electronic device of claim 15, wherein the predetermined decoding network is associated with two or more languages of English, Chinese, Japanese, Russian, French, German and the like, and includes a subset of keywords and a subset of filler words for each of the two or more languages.

19. A non-transitory computer-readable medium, having instructions stored thereon, which when executed by one or more processors cause the processors to perform operations comprising:
receiving a sequence of audio frames comprising a current frame and a subsequent frame that follows the current frame;
determining a candidate keyword for the current frame using a predetermined decoding network that comprises keywords and filler words of multiple languages,
associating the audio frame sequence with a confidence score that is partially determined according to the candidate keyword;
identifying a word option for the subsequent frame using the candidate keyword and the predetermined decoding network;
when the candidate keyword and the word option are associated with two distinct types of languages, updating the confidence score of the audio frame sequence based on a penalty factor that is predetermined according to the two distinct types of languages, the word option and an acoustic model of the subsequent frame; and
determining that the audio frame sequence includes both the candidate keyword and the word option by evaluating the updated confidence score according to a keyword determination criterion.

20. The non-transitory computer-readable medium of claim 19, wherein the operations performed by the processors further comprise:
establishing a penalty factor table including a plurality of penalty factors each associated with two different languages, wherein the penalty factor used for updating the confidence score of the audio frame sequence is identified by looking up the penalty factor table based on the two distinct language types of the candidate keyword and the word option.

* * * * *